Oct. 27, 1953 M. ROMANIUK 2,656,629

MECHANISM FOR TURNING THE PAGES OF A BOOK

Filed Sept. 16, 1949 11 Sheets-Sheet 1

INVENTOR.
MIRKO ROMANIUK
BY
Woodling and Krost
attys

INVENTOR.
MIRKO ROMANIUK
BY
Strodling and Krost
attys.

Oct. 27, 1953 M. ROMANIUK 2,656,629

MECHANISM FOR TURNING THE PAGES OF A BOOK

Filed Sept. 16, 1949 11 Sheets-Sheet 3

INVENTOR.
MIRKO ROMANIUK
BY
Strodling and Kroat
attys.

INVENTOR.
MIRKO ROMANIUK
BY
Goodling and Kroot
attys.

INVENTOR.
MIRKO ROMANIUK
BY
Woodling and Krost
attys.

INVENTOR.
MIRKO ROMANIUK
BY
Strodling and Kroot
attys

Oct. 27, 1953 M. ROMANIUK 2,656,629

MECHANISM FOR TURNING THE PAGES OF A BOOK

Filed Sept. 16, 1949 11 Sheets-Sheet 7

INVENTOR.
MIRKO ROMANIUK
BY
Stradling and Kroat
attys.

INVENTOR.
MIRKO ROMANIUK
BY
Stoodling and Krost
attys.

INVENTOR.
MIRKO ROMANIUK
BY
Stoodling and Kroat
attys.

Oct. 27, 1953 M. ROMANIUK 2,656,629

MECHANISM FOR TURNING THE PAGES OF A BOOK

Filed Sept. 16, 1949 11 Sheets-Sheet 10

INVENTOR.
MIRKO ROMANIUK

BY

Hoodling and Krost
attys.

Oct. 27, 1953 M. ROMANIUK 2,656,629

MECHANISM FOR TURNING THE PAGES OF A BOOK

Filed Sept. 16, 1949 11 Sheets-Sheet 11

INVENTOR.
MIRKO ROMANIUK

BY Strodling and Krost
attys.

Patented Oct. 27, 1953

2,656,629

UNITED STATES PATENT OFFICE 2,656,629

MECHANISM FOR TURNING THE PAGES OF A BOOK

Mirko Romaniuk, Cleveland, Ohio

Application September 16, 1949, Serial No. 116,098

14 Claims. (Cl. 40—104)

This invention relates to a mechanism for separating the top one of assembled sheets from the sheet next adjacent to said top sheet, and more particularly to a mechanism for turning the pages of a book.

An object of the invention is to provide cyclic means for turning the pages of a book.

Another object of the invention is to provide for holding a book in a forwardly tilted position with the open pages of the book facing generally downwardly and defining a leading tilted angle with respect to the vertical, whereby a person positioned beneath the book may read the book by looking generally upwardly toward the book.

Another object of the invention is the provision of a cyclically operated book-holding mechanism, whereby the book is normally held in a readable position at the completion of a recurrent cycle and whereby the top one of the turnable pages may be turned during movement of the book-holding means through the recurrent cycle.

Another object of the invention is the provision of a cyclically operated book-holding mechanism which is operated through a recurrent cycle, during which cycle the top one of the turnable pages may be turned and in which the book is held in a readable position at the completion of the recurrent cycle.

Another object of the invention is the provision of a cyclically controlled book-holding mechanism which operates through a recurrent cycle in which the top one of the turnable pages of the book is turned during the first half-cycle and in which the book is restored to its readable position at the conclusion of the second half-cycle.

Another object of the invention is the provision of two spaced surface means between which a book may be held in a readable position, taken in combination with means for separating the two surface means, whereby the top one of the turnable pages may be turned while said two spaced surface means are separated.

Another object of the invention is the provision of suction orifice means located at a spaced distance from the top one of the turnable pages for lifting the top one of the turnable pages, taken together with means for depressing the lifted page to insure separation of the next adjacent page from the top page so that a page-turning element may be inserted between the top and the next adjacent pages for turning the top page.

Another object of the invention is the provision of cyclically operated book-holding means whereby the top one of the book pages is turned during one complete recurrent cyclic movement and whereby the book is held in a readable position at the conclusion of the recurrent cycle, taken in combination with the provision that the book-holding means may be arrested at the conculsion of the first half-cycle for enabling the operator to remove the book from the book-holding means and replacing it with a new book.

Another object of the invention is the provision of holding the open pages of a book in a readable position by supporting the open pages of the book upon surface holding means and of separating the book from the surface holding means, during which separation the top one of the turnable pages is turned, after which the book is re-supported on the surface holding means.

Another object of the invention is to hold the book in a forwardly tilted position for reading purposes and then moving the book back to a rearwardly tilted position, during which tilting movement the top page of the book may be turned, and then restoring the book to its original forwardly tilted position for reading purposes.

Other objects and a fuller understanding of my invention may be had by referring to the following description and claims, taken in conjunction with the accompanying drawing, in which:

Figure 2:
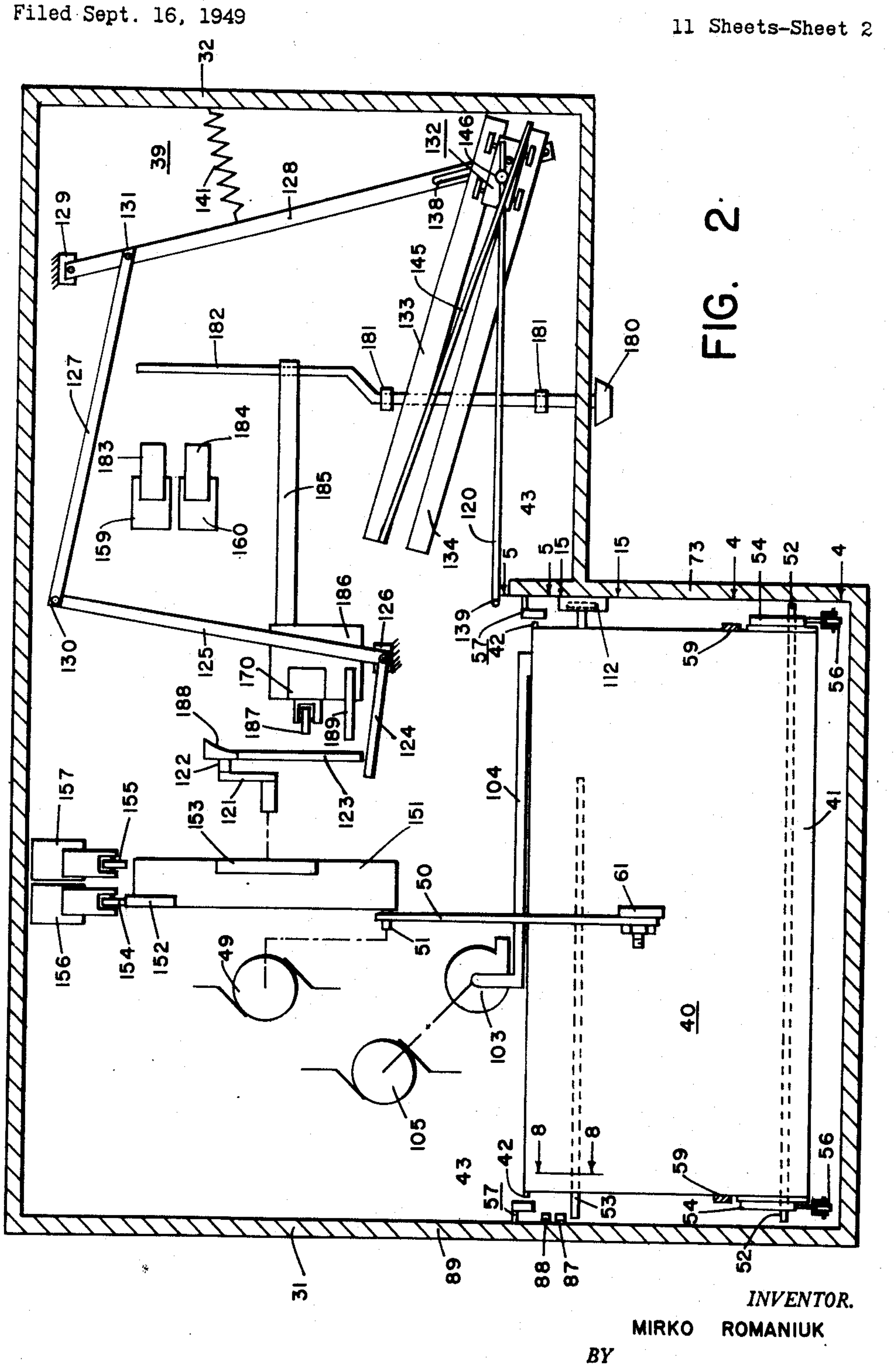
Figure 2 is a plan view of the mechanism taken along the line 2—2 of Figure 1, and shows the general arrangement of the mechanism with some of the parts shown diagrammatically.
Figures 8, 9, 10, 11:
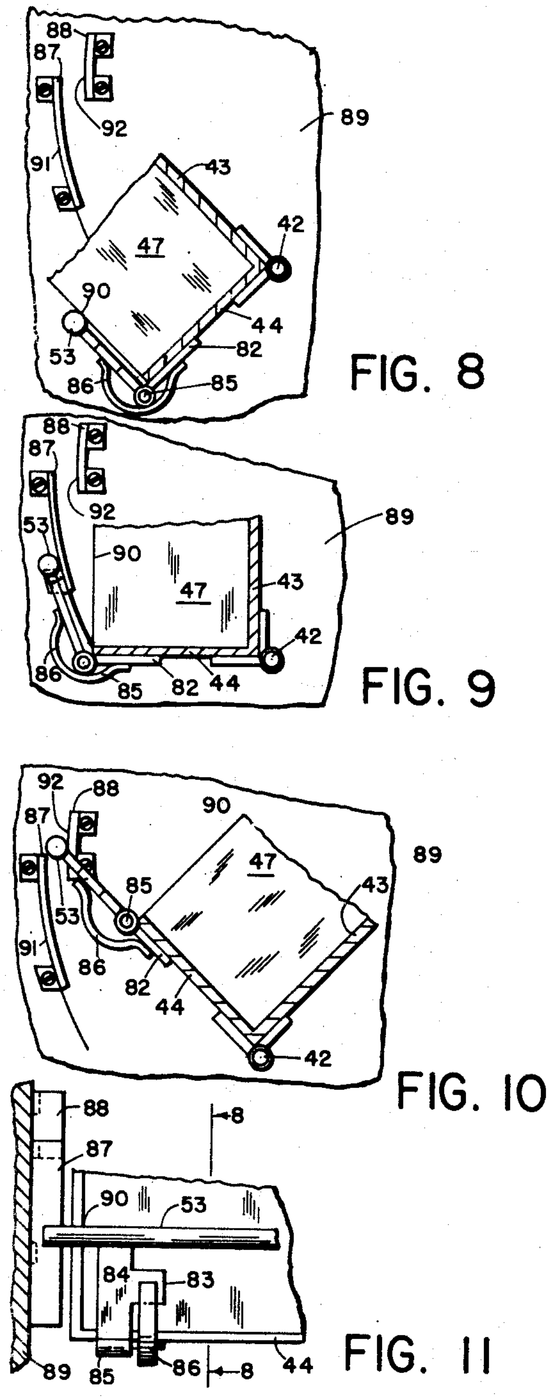
Figure 8 is a fragmentary view of the book-holding means taken along the line 8—8 of Figure 2, and shows principally the cam arrangement for raising the bottom transversely extending rod that holds the book as the book-holding means is operated through its recurrent cycle.
Figure 9 is a view similar to Figure 8 with the book-holding means being tilted substantially to its vertical position.
Figure 10 is a view similar to Figures 8 and 9 and shows a book-holding means in a rearwardly inclined position.
Figure 15:
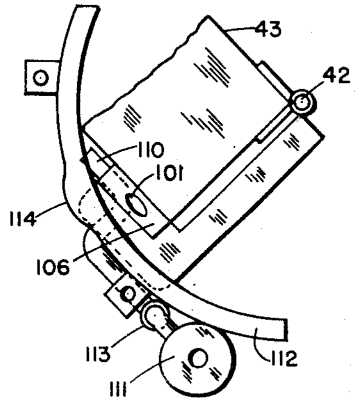
Figures 16, 17:
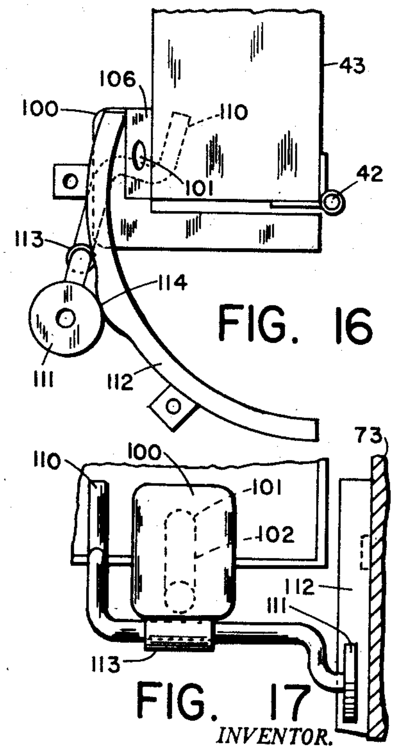
Figures 12, 13, 14:
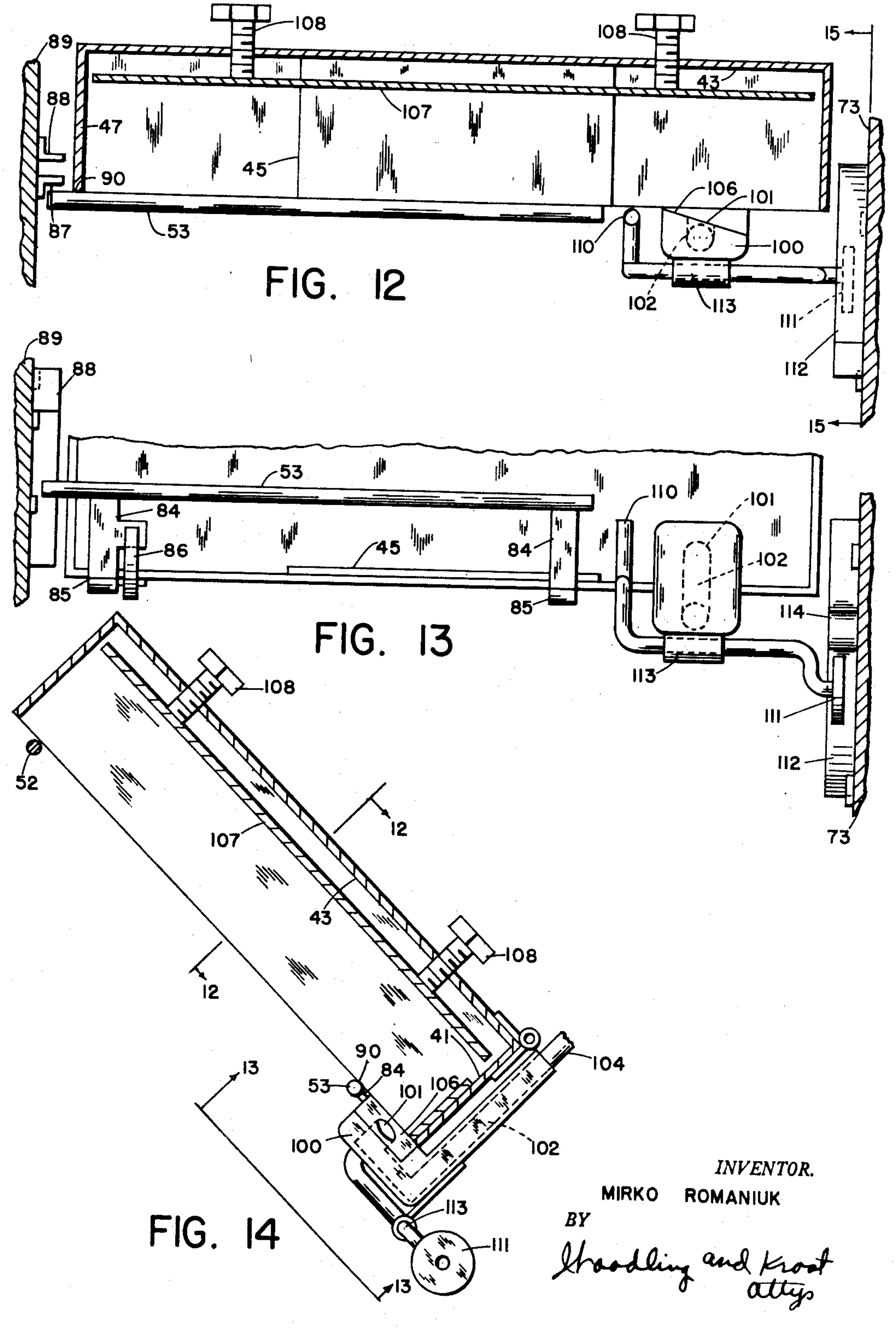
Figure 23:
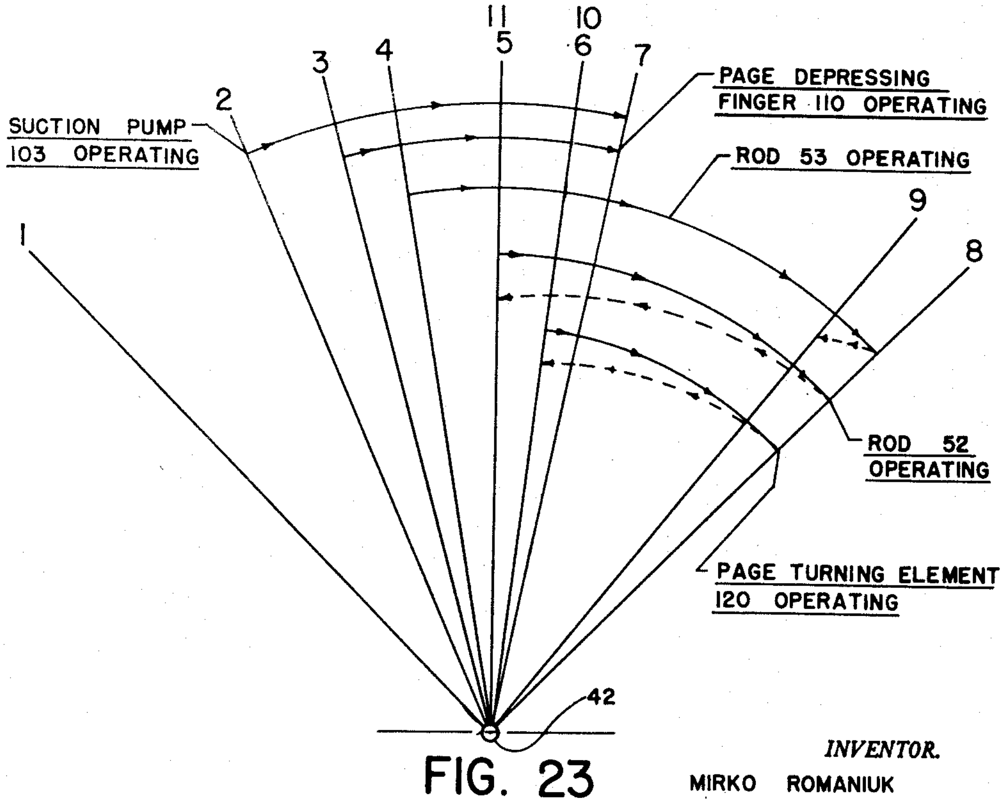
Figures 24, 25, 26:
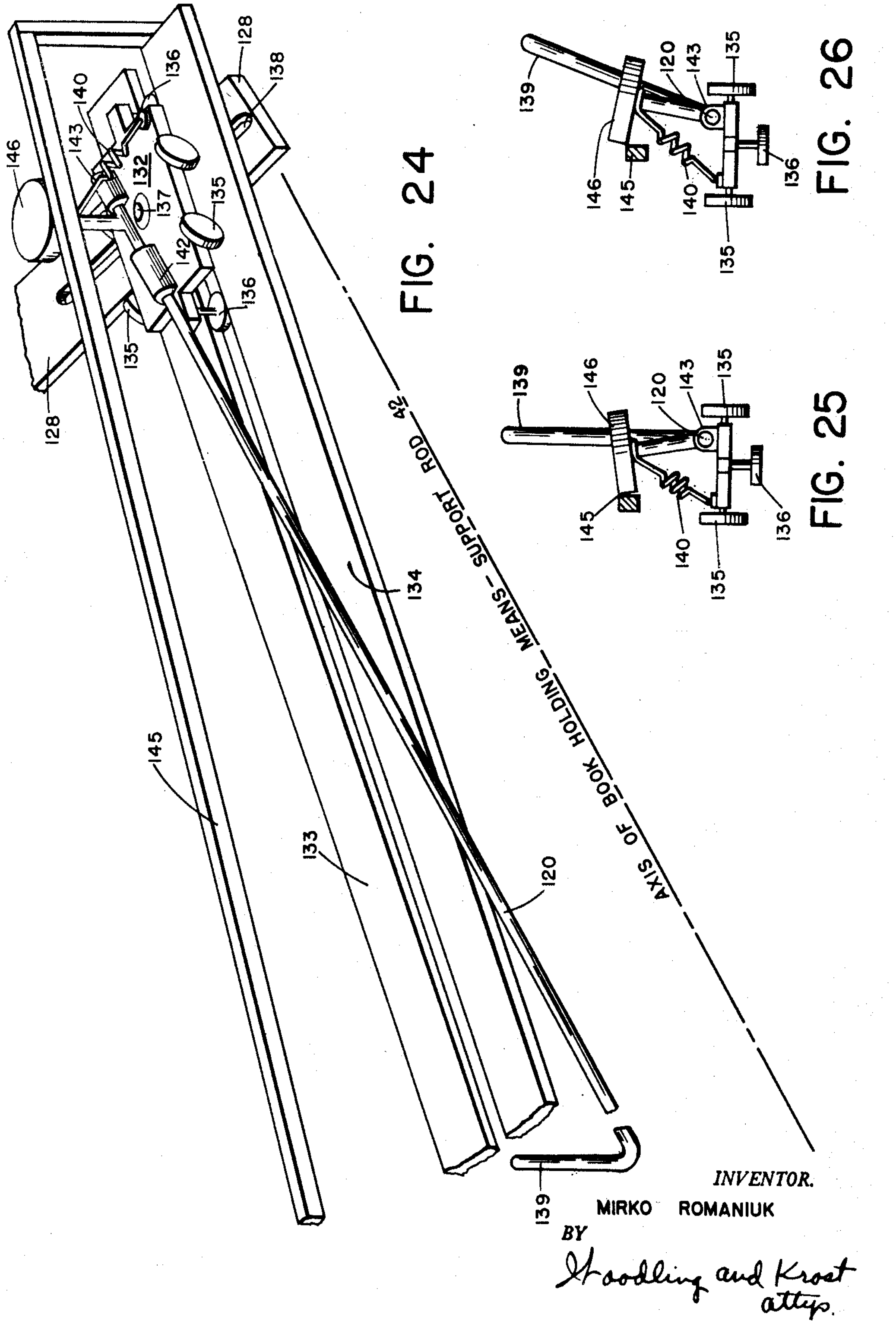
Figure 27:
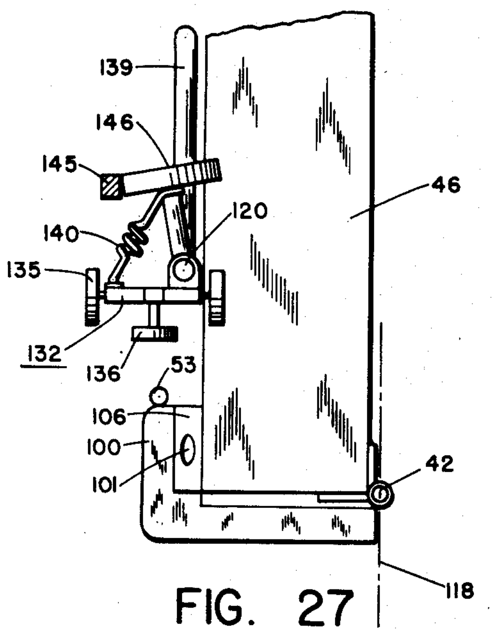
Figure 28:
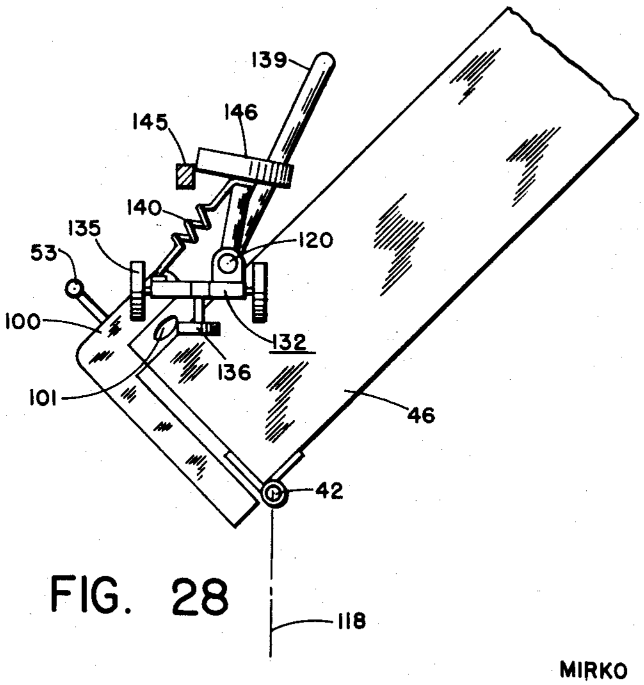
Figure 29:
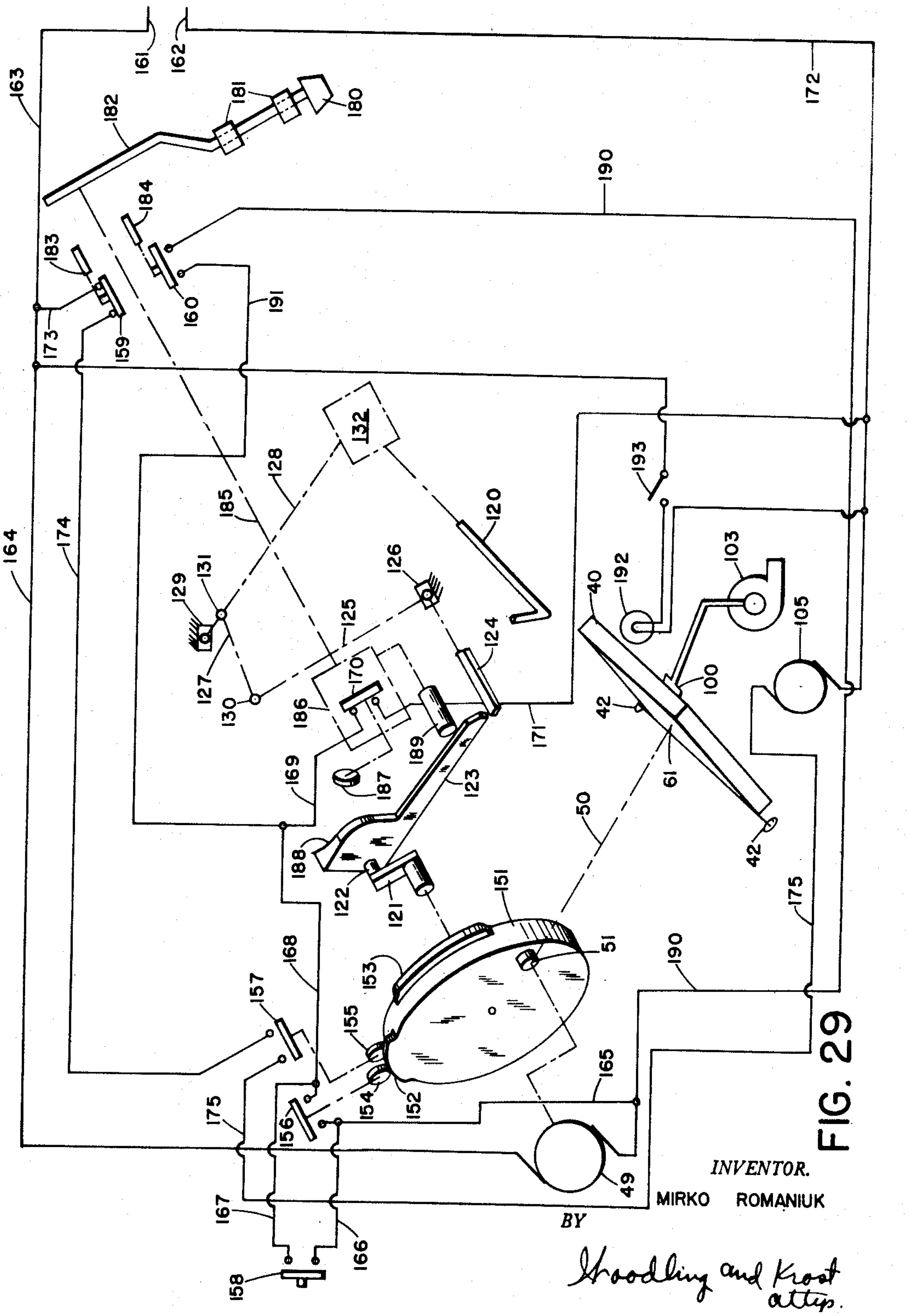
Figure 30:
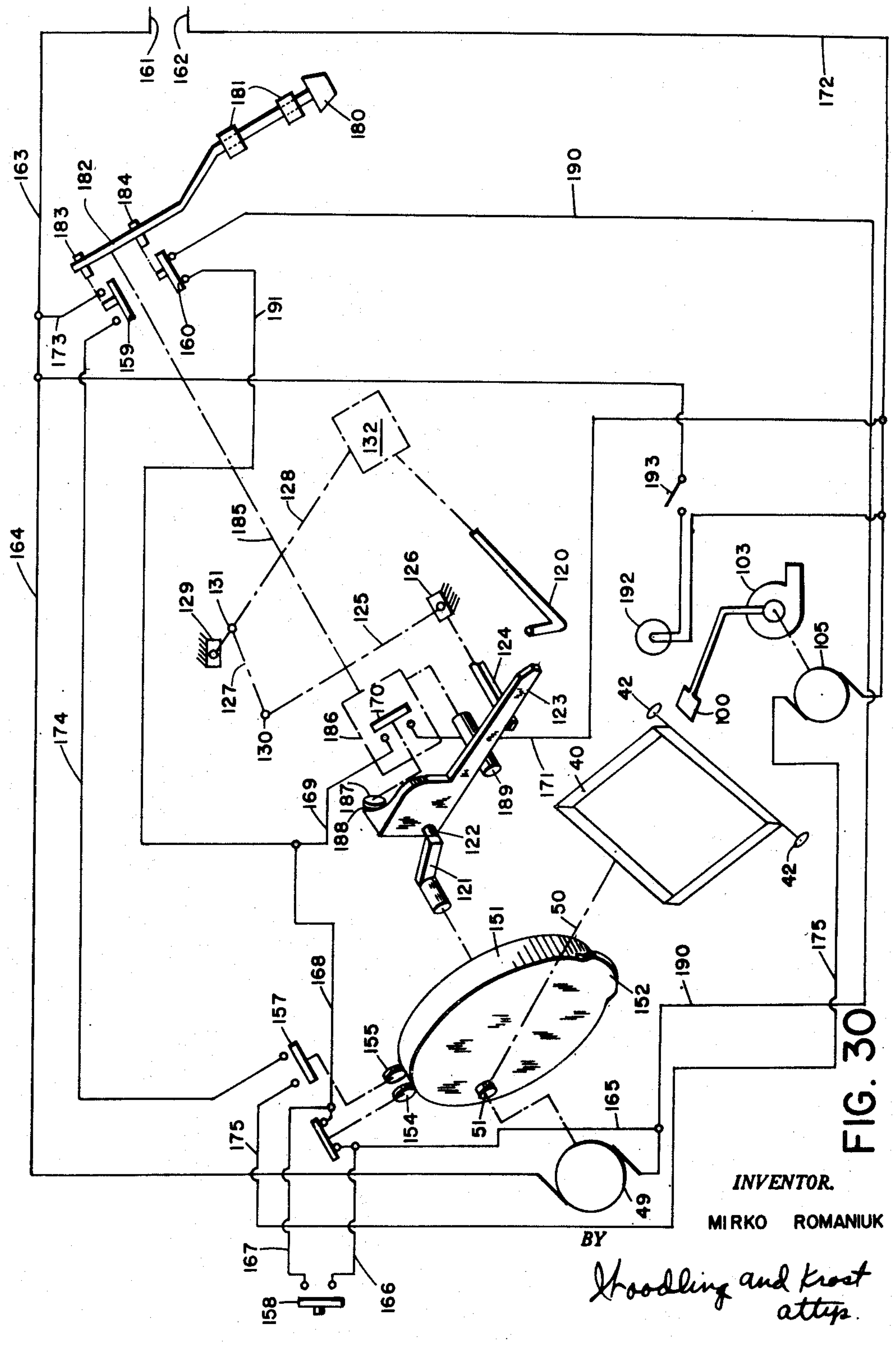

Figure 11 is a fragmentary view looking directly into Figure 8 showing principally the lower transversely extending rod which holds a book in readable position together with the cams for raising the transversely extending rod from the book while turning the page, the line 8—8 in Figure 11 co-extending substantially with the line 8—8 of Figure 2 and defining a plane for the cross-sectional view in Figure 8;

Figure 12 is a cross-sectional view of the book-holding means taken along the line 12—12 of Figure 14 and shows principally the suction head and the depressing finger for separating the top turnable sheet from the next adjacent sheet of the book;

Figure 13 is a fragmentary view of the bottom portion of the book-holding means, being the view observed from the line 13—13 in Figure 14, the left-hand side of the Figure 13 being substantially the same as the fragmentary view shown in Figure 11;

Figure 14 is a side-elevational view, part being shown in section, of the book-holding means shown in its forward inclined position, being the position in which the book is held in its readable position, and illustrates principally the suction head and the depressing finger for separating the top one page of the turnable book from the next adjacent page;

Figure 15 is a fragmentary view of the book-holding means taken along the line 15—15 of Figure 12 and illustrates principally the cam arrangement for depressing the finger that contacts the top one page of the turnable book for separating the next adjacent page from the top page, the book-holding means being shown in its forward inclined position;

Figure 16 is a view similar to Figure 15 but shows the book-holding means tilted to its vertical position;

Figure 17 is a fragmentary view of the suction head and depressing finger as shown in Figure 15 looking directly at the figure, the Figure 17 being substantially the same as the right-hand portion of the Figure 13;

Figures 18 to 22, inclusive, illustrate diagrammatically the various conditions of the top one turnable page as it is turned by the mechanism;

Figure 23 illustrates the position to which the book-holding means is operated through its recurrent cycle, the position 1 being the position of the book-holding means when holding the book in its readable position, and the other position indicated in the Figure 23 indicating the point where certain cyclic movements take place for turning the page of the book;

Figure 24 is a perspective view illustrating the carriage mechanism which actuates the page-turning element;

Figure 25 is a rear view of the carriage and page-turning element of the mechanism shown in Figure 24, certain parts being removed to make a clear view;

Figure 26 is a view similar to Figure 25 but shows the carriage moved to a position to the left of that shown in Figure 24, the views 25 and 26 showing principally how the page-turning element is shifted laterally when turning the page;

Figure 27 is a further extension in application of the Figure 25 and shows the Figure 25 in relation to the position of the book-holding means during the initial movement of the page-turning element;

Figure 28 is a view similar to Figure 27 but shows the position of the page-turning element and the book-holding means during the final movement of the page-turning element for turning the page of the book;

Figure 29 is a diagrammatic view of the mechanism of the entire machine showing both the electrical and mechanical movement diagrammatically with the parts resting in a position where the book is held in its readable position; and Figure 30 is a view similar to Figure 29 but shows the parts in an arrested or decontrolled position whereby the book-holding means is in a position for exchanging one book for another.

The mechanism for turning the pages of the book may be mounted inside of a housing 31 which is carried by upright supports 33 having feet 34 mounted on casters 35 whereby the housing 31 may be positioned over a bed whereby the reader may read the book while lying down. The book which is to be read is observable through the window 36 which is inclined at a forward leaning angle to the vertical. Thus, with the use of the present invention the user may look generally upwardly and read the book through the window 36 at a comfortable angle or position. Extending to the right of the housing 31 is a side compartment 32 which also includes a part of the mechanism for turning the pages of the book. The top part of the housing 31 is provided with a removable cover 37 whereby the operator may gain access to the inside of the housing for inserting a new book in the mechanism for turning the pages of the book. When the operator desires to have the mechanism turn a page of the book it is only necessary for him to depress the push button 158 and the push button in turn will start the operation of a motor which operates the mechanism through a recurrent cycle for turning the top page of the book. At the end of the recurrent cycle, the book is re-positioned in front of the window 36.

Figure 1:
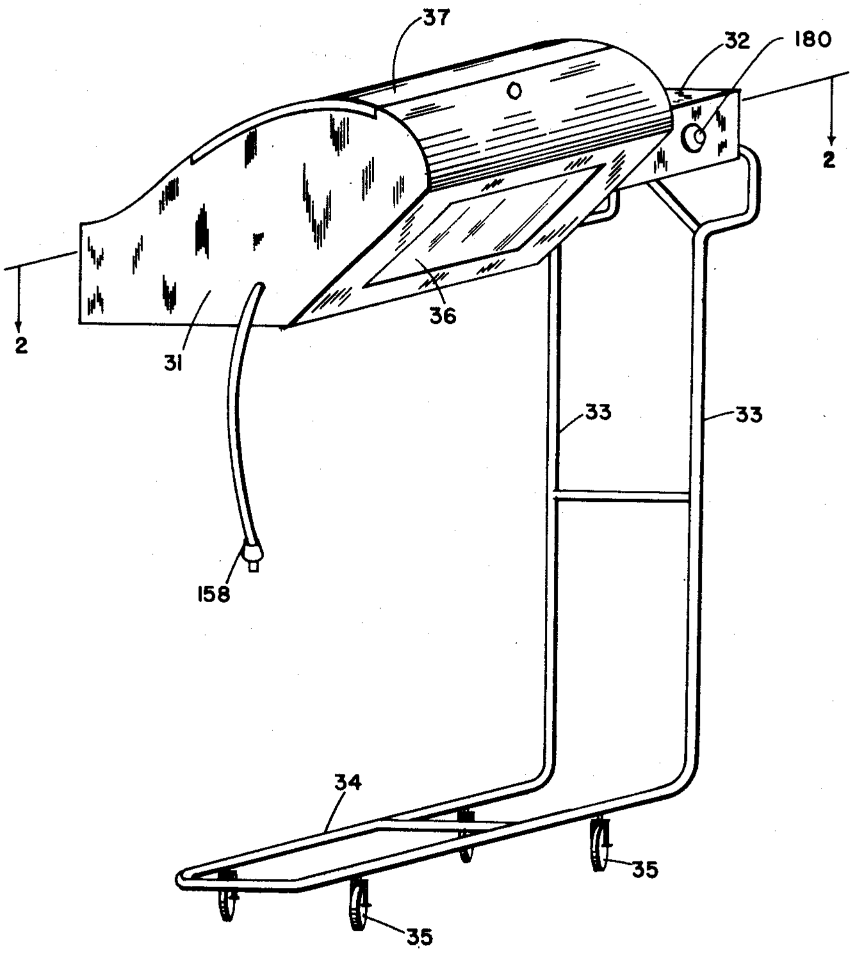
Figure 1 is a perspective view of the mechanism for turning the page of a book embodying the features of my invention, and is shown in connection with a stand having casters whereby the stand may be positioned next adjacent to a bed or other body supporting device whereby the user may look generally upwardly and read the book held within the mechanism.

The Figure 2 shows a cross-section of the housing taken along the line 2—2 of Figure 1 and illustrates the mechanism for turning the page of the book, part of the mechanism being shown diagrammatically and part being shown mechanically to effect the recurrent cyclic movement for turning the page of the book. As shown in Figure 2, the entire housing 31 and the side compartment 32 is provided with a bottom 39 which carries the mechanism for turning the page of the book. Hingedly mounted in the housing 31 in front of the window 36 is a book-holding means 40, the back side of which is shown in Figure 2. The book-holding means 40 is adapted to be tilted through a recurrent cycle by the operation of an electric motor 49 which drives a crank pin 51, which in turn is connected to a pivot connection 61 by means of a connecting rod 50. Thus, as the crank pin 51 makes one complete revolution, the book-holding means 40 is swingably operated through a recurrent cycle during which time the page of the book is turned, the book-holding means at the conclusion of the recurrent cycle being repositioned to the place shown in Figure 2. Looking from right to left in Figure 2, the book-holding means is operated through a recurrent cycle beginning at a first position shown in Figure 23 and advancing through a second, third, fourth, fifth, sixth, seventh, eighth, ninth, tenth and eleventh position back to the first position. The first position is the readable position of the book and is at a leaning angle with respect to the vertical. The first to the eighth positions embrace the first half-cycle and the eighth position to the first position embraces the second half-cycle. The eighth position, which is at the end of the first half-cycle, is at a lagging inclined angle to the vertical. Accordingly, in one complete recurrent cycle the book is moved from the first position through the first half-cycle to the eighth position and then back again to the first position, during which recurrent cycle the page of the book is turned and is ready to be read in the position one at the finish of the complete recurrent cycle.

Figure 3:
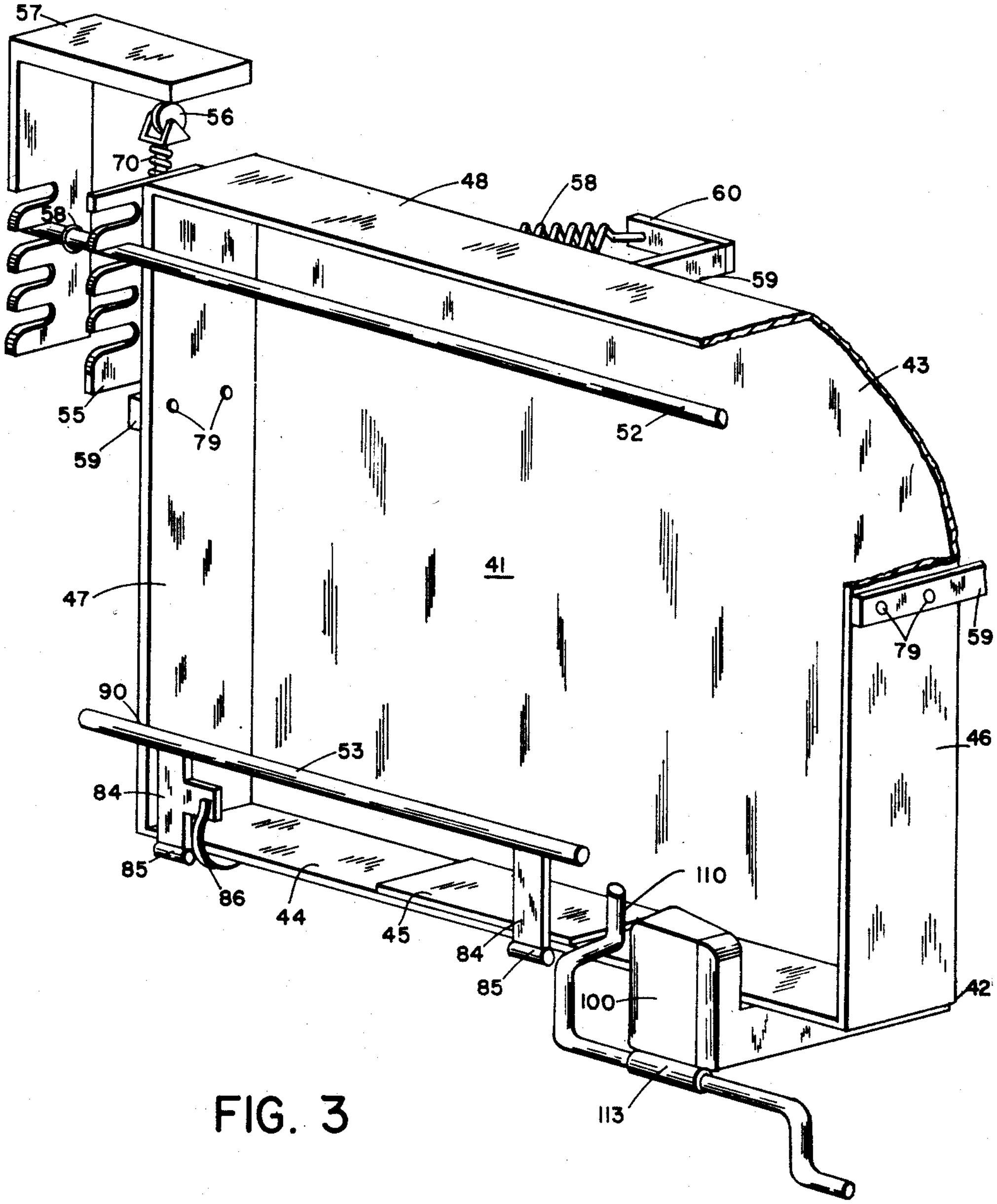
Figure 3 is a perspective view of the book-holding means in which the book is placed and which is operated through a recurrent tilting cycle, during which tilting cycle the page of the book is turned, the view being shown in its vertical position.

A perspective view of the book-holding means 40 is shown in Figure 3 and comprises a box-like receptacle 41 hingedly supported by a rod 42 having its ends carried by the housing 31. The bottom of the box-like structure 41 is indicated by the reference character 43 and there are four sides, namely, the bottom edge 44, the right-hand side edge 46, the left-hand side edge 47, and the top edge 48. A central plate 45 is provided upon the inside surface of the bottom edge 44 so that the lower edge of the book may rest upon this center plate 45 to give freedom to the turning of the pages and prevent them from encountering the inside surface of the bottom edge 44.

Figures 4, 5, 6, 7:
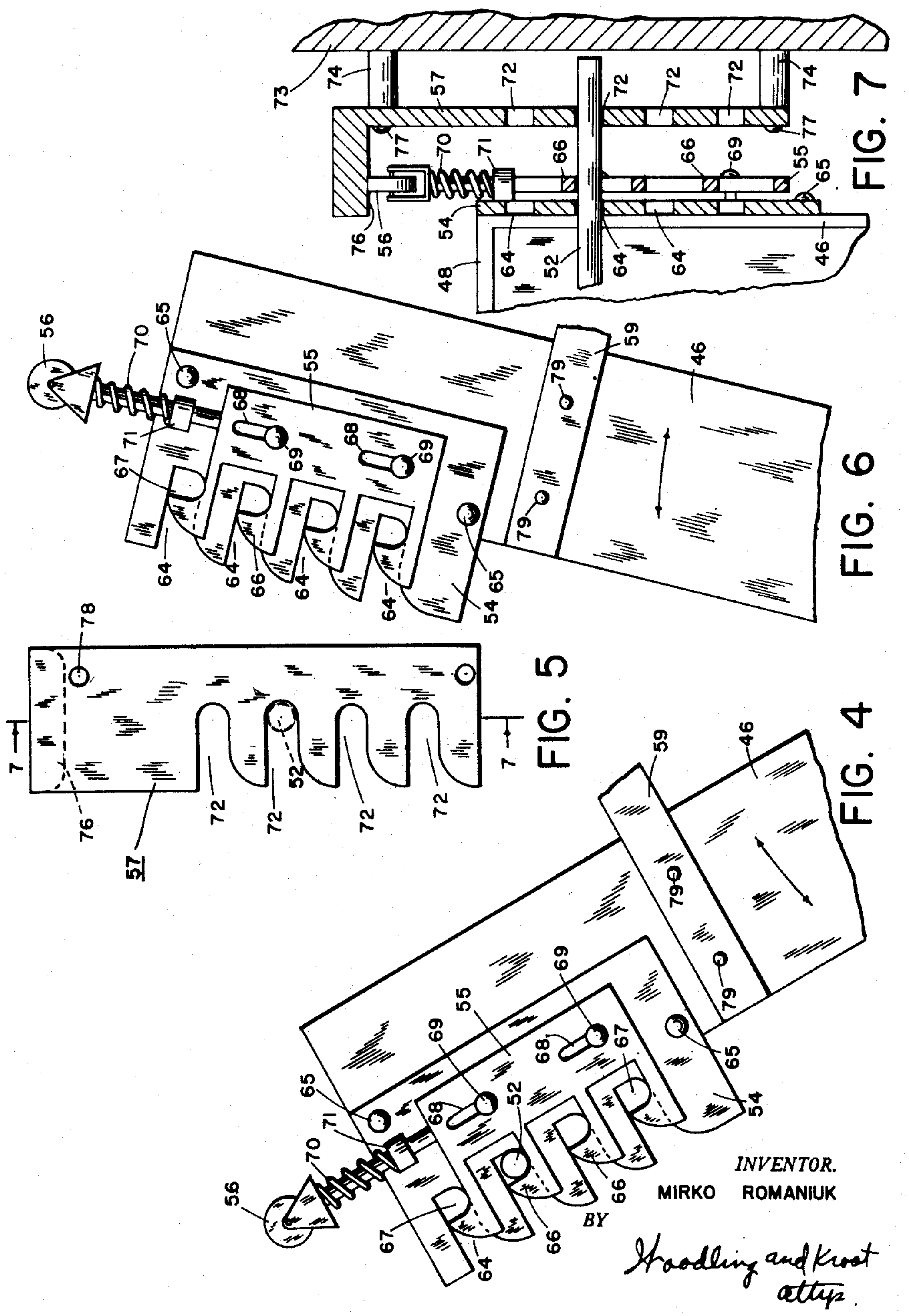
Figure 4 is a fragmentary view of the side of the book-holding means, being taken along the line 4—4 of Figure 2 and illustrates principally the releasable socket means for holding a transversely extending rod that extends across the face of the book-holding means for holding the book within the book-holding means.
Figure 5 is a side elevational view of a hook member taken along the line 5—5 of Figure 2, and illustrating principally the manner in which the hook member intercepts the rod releasably held by the socket releasable means shown in Figure 4.
Figure 6 is a view similar to Figure 4 but shows the book-holding means tilted rearwardly to a position in rear of the catch element shown in Figure 5.
Figure 7 is a cross-sectional view taken along the line 7—7 of Figure 5 and shows in addition to the catch element the cross-section of the socket releasable means shown in Figure 4 when the two are in substantial vertical alignment with each other, and being the position where the catch element intercepts the transversely extending rod from the releasable socket means in Figure 4.

The book is placed in the box-like receptacle 41 with the covers of the book resting against the bottom surface 43 and with the open pages of the book being held therein by a top holding rod 52 and a bottom holding rold 53. When the book-holding means 40 is in the first position, the top rod 52 and the bottom rod 53 hold the open pages of the book in front of the open window 36. In other words, when the book-holding means 40 is in the first position, the open pages of the book rest against the top holding rod 52 and the bottom holding rod 53. These rods extend across the top and bottom margins of the pages of the book so that they do not interfere with the reading matter. The top holding rod 52 is releasably carried at its end by socket members 54 secured to opposite sides 46 and 47 of the box-like receptable 41. In Figure 3, the upper right-hand corner of the box is cut away so that the socket member 54 in Figure 3 does not show. However, the socket member 54 which is not shown in Figure 3 is shown in Figure 4 and is mounted to the side 46 of the box-like receptable 41. As illustrated in Figure 4, the socket member 54 may be fastened to the side 46 by means of holding rivets 65. In Figure 4, the left-hand side of the socket member 54 is provided with a plurality of socket slots 64, there being a plurality number to adjust the height of the holding rods 52 to accommodate books of different size. Slidably mounted on top of the socket member 54 is a catch member 55 having sliding elongated slots 68 that slide up and down relative to rivet pins 69. The left-hand side of the catch member 55 in Figure 4 is provided with catch latches 66 which provide releasable catch sockets 67 for holding the opposite ends of the bar 52, the bar 52 in Figure 4 being shown in the second socket from the top. The catch member 55 is adapted to be pushed to its lower releasable position by means of a cam 56. A spring 70 having its lower end resting upon a stop 71 is adapted to urge the catch member 55 upwardly whereby it holds the rod 52 in the socket member 54. As the book-holding means 40 swings from the first position to the fifth position, the ends of the rod 52 are intercepted by a hook member 57 having a plurality of hook slots 72. The rod 52 in Figure 5 is shown in dash-dot lines and indicates the position of the rod 52 as it is intercepted and held by the hook member 57 as the book-holding means 40 swings by the position five as shown in Figure 23. As the book-holding means 40 swings beyond the position five, being indicated by the Figure 5 of the drawing, the rod no longer is carried by the releasable socket member 54 which means that the rod is spaced from the front pages of the book to give clearance for the turning of the page. The rod 52 is held in the hook member 57 until the book-holding means 40 swings backwardly to the position eight and then back again to position eleven, being the same location as position five, at which time the socket member 54 again releasably engages the rod 52 for holding same securely across the face of the book whereby as the book is tilted forwardly to the position one the rod 52 holds the top portion of the book within the box-like receptacle 41. The Figure 7 is a cross-section of the socket member 54 and the catch member 55 in position five, and it is to be noted that the hook member 57 is fastened to the side wall 73 of the housing by means of anchoring posts 74 which hold the hook member 57 at a distance from the inside of the wall 73. The hook member 57 is provided with openings 78 whereby screws 77 may extend therethrough for engaging the posts 74 for holding the hook member 57 at a spaced distance from the inside wall 73 of the housing. The hook member 57 is provided with an overhanging cam surface 76 under which the cam wheel 56 passes for depressing the catch member 55 for releasably disengaging the rod 52 as it is intercepted by the hook member 57. The cam wheel 56 is actuated in position five in Figure 23 to operate the catch member 55 for releasably freeing the rod 52. The ends of the rod 52, after they are intercepted by the hook sockets 72 in the hook member 57, are held therein by means of a spring 58 having one end connected to the end portion of the rod 52 and having the other end connected to an anchoring pin 60 carried by a bracket 59 that extends rearwardly of the box-like receptacle 41 and is anchored thereto by rivets 79, see Figure 3. A spring 58 is mounted on each side of the box-like receptacle 41, but only one is shown in Figure 3. As the box-like structure 41 is moved from position five back to position eight, each spring 58 merely elongates and firmly holds the end portions of the rod 52 in the hook sockets 72 of the hook member 57. The top page is turned while the book-holding means passes from the position five to the position eight, and thus the rod 52 is spaced from the front pages of the book whereby the pages have clearance space to be turned. After the page is turned, the book-holding means passes from the position eight back to the position eleven which coincides with the position five and thereupon the socket member 54 releasably re-engages the end portions of the rod 52 and removes it from the hook member 57 and the open pages of the book again rest upon the rod 52 as the book-holding means 40 is retilted to its forward inclined position in front of the open window 36 of the housing. From the position five back to the position eight, the book is retained in the box-like receptacle 41 by means of gravity since the angle of the book from positions five to eight is of a rearwardly inclined position.

The bottom rod 53 which extends across the lower portion of the open pages of the book is carried by hinge members 84 having a hinged joint 85 and is adapted to be raised from the front pages of the book from position four to position nine in Figure 23. For all other positions of the rod 53 it is constrained by means of a spring 86 whereby it rests against the side edge 47 of the box-like receptacle and engages the edge of the box at the reference character 90. As shown in Figure 8, which is a cross-section taken along the line 8—8 of Figures 2 and 11, the spring has its fixed end anchored to the lower hinge member 82 with its free end looped around and contacting a portion 83 extending laterally from the hinge member 84. In Figure 8 the rod 53 is contacting the side 47 of the box-like receptacle at the reference character 90 and this is the position of the rod 53 when the book is held in readable position in position one of Figure 23. That is to say, the lower portion of the pages of the book rest against the rod 53 in position one of Figure 23, being the position of the book-holding means as shown in Figure 8. As the book-holding means 40 is tilted rearwardly, the extended left-hand end of the rod engages the back side 91 of a cam 87 substantially at position four in Figure 23, and as the book-holding means moves further rearwardly the rod 53 is raised from the side 47 and spaced at a distance from the reference character 90 where it rests in its downward holding position. In Figure 9, the end of the rod 53 is on the back side of the cam 87 and it is noted that the rod 53 is raised from the reference character 90, this being the position shown in position five of Figure 23. In Figure 10, the book-holding means 40 has reached the position eight of Figure 23 and here it is noted that the bar 53 is held completely away from the reference character 90 on the edge of the side 47 of the box-like receptacle 41. As previously explained, the page is turned between the positions five and eight of Figure 23 and thus during this travel of the book-holding means rearwardly the rod 53 is at a spaced distance from the front page of the book, whereby freedom is given to the turning of the page of the book. As the book-holding means 40 returns on its return cycle at position nine, the rod 53 then clears the inside surface 92 of a cam 88 and then is immediately snapped back by spring 86 into position with the rod 53 contacting the reference character 90 on the side 47 of the box-like receptacle. As shown in Figures 2, 8, 9, 10 and 11, the cams 87 and 88 are fastened to the inside wall 89 of the housing. Again, it is to be noted that in the readable position of the book the front pages of the book rest upon the top and bottom rods 52 and 53, but when the page of the book is being turned the rods 52 and 53 are spaced from the front pages of the book.

The bottom edge 44 of the box-like receptacle 41 in its right-hand portion is provided with a suction orifice means or head 100 which is adapted to raise the top one of the turnable pages when the suction is applied, which occurs between positions two and seven in Figure 23. The face of the suction head is indicated by the reference character 106 and is at an angle as shown in Figure 12. The suction face 106 is provided with a suction opening 101 which communicates with a passageway 102 that is connected to a suction pump 103 by means of a flexible conduit 104, see Figures 2, 12, 13 and 14. The suction pump 103 is driven by an electric motor 105. When the suction is applied, the top one of the turnable pages is drawn up against the inclined face 106. In order to accommodate books of different thickness, the box-like receptacle 41 may be provided with an adjustable bottom plate 107, see Figures 12 and 14. The adjustable plate 107 may be raised or lowered within the box-like receptacle by turning the adjustment screws 108. In the case of a thin book, the adjustment screws 108 are turned in and in the case of a thick book, the adjustment screws 108 are turned out. The purpose of the adjustment screws is to keep the top one of the turnable pages within the vicinity of the inclined face 106 of the suction head to insure that the top one of the turnable pages will be raised by the action of the suction.

Inasmuch as the page next adjacent to the top turnable page may stick to the top page, I provide for depressing the top turnable page by means of a page depressing finger 110 to insure separation of the top turnable page from the next adjacent page. As shown in Figures 12 to 17, the page depressing finger 110 is actuated by a roller cam 111 that rides on a cam surface 112 that has a raised portion 114. The cam wheel 111 rides over the raised portion 114 between the positions three and seven of Figure 23, which means that during this interval the page depressing finger 110 presses down upon the top page to insure separation of the next adjacent page from the underneath side of the lifted top page. The page depressing finger 110 is rotatively mounted in a bearing member 113 fastened to the suction head 100. The page depressing finger 110 engages the lifted page between the inside edge of the suction head 100 and the center of the book. The Figures 12 and 15 show the position of the depressing finger 110 when the book-holding means is in the position one of Figure 23, and here it is noted that the page depressing finger 110 is free of the lifted page. The Figure 16 shows the depressing finger in the position seven of Figure 23, and here the finger is pressing down upon the top turnable page between the inside edge of the suction head and the center of the book.

Figure 18:
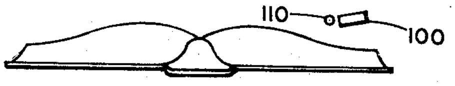
Figure 19:
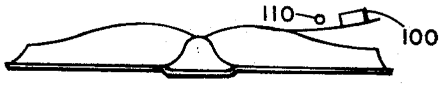
Figures 19A, 21:
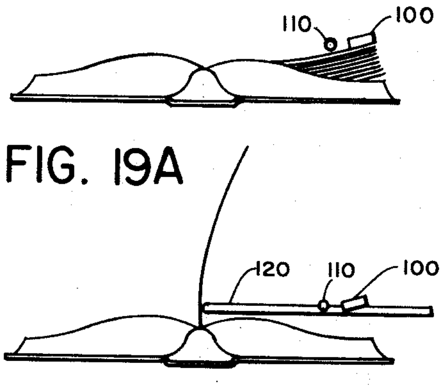
Figure 20:
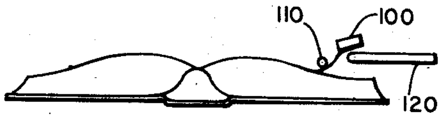
Figure 22:
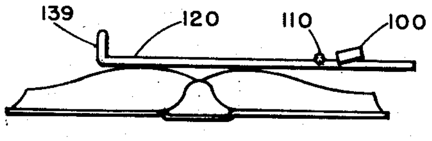

The Figures 18 to 22 illustrate diagrammatically the action of the suction head and the depressing finger 110 during the process of lifting the top one of the turnable pages and of separating the top lifted page from the next adjacent page, whereby a page-turning element 120 may be inserted therebetween for turning the page. In Figure 18, the suction is not on and the book is in its readable position, being position one in Figure 23. In Figure 19, the suction is on and has lifted the top one of the turnable pages as illustrated and it may carry along therewith the next adjacent pages such as shown in Figure 19A. Beginning at position three in Figure 23, the page depressing finger 110 begins to press the top one of the turnable pages such as shown in Figure 20, thereby assuring separation of the top page from the next adjacent page since the top page is still held by the suction action of the suction head 101 and since the next adjacent page is pressed down along with the top page by the page depressing finger 110. The position of the page depressing finger 110 in Figure 20 occurs at position seven in Figure 23, and it is noted that the page turning element 120 has entered between the top page and the next adjacent page, this entrance occurring in position six of Figure 23. From position six to position eight, the page-turning element 120 moves across the top pages of the book for turning the top page such as shown in Figure 21. The complete lateral movement of the page-turning element 120 is completed in Figure 22 and corresponds to position eight of Figure 23. As the book-holding means moves from position eight back to position six, the page-turning element 120 moves to the right again and clears the book. It is to be noted that as the page-turning element 120 turns the top page, the book is resting within the box-like receptacle 41 with the top and bottom holding rods 52 and 53 being separated therefrom as previously described.

As shown in Figures 2, 24, 25, 26, 27 and 28, the page-turning element 120 is operated laterally between the top lifted page of the book and the next adjacent page by means of a carriage 132 that rides on slide rails 133 and 134. A plurality of rollers 135 carry the carriage on top of the slide rails 133 and 134 and a plurality of rollers 136 operate between the slide rails to direct the movement of the carriage on top of the slide or guide rails. The movement of the carriage 132 along the slide or guide rails 133 and 134 is effected by an actuating lever 128 that has its end slotted at 138 to receive a driving pin 137 that extends downwardly from the underneath side of the carriage. As shown in Figures 2, 29 and 30, the actuating lever 128 is moved by means of a crank 121 driven by the electric motor 49. As illustrated, the crank 121 is provided with a crank pin 122 and this operates a push rod 123 which is reciprocated back and forth as the crank 121 is turned. The free end of the push rod 123 engages an L-shaped lever having a first part 124 and a second part 125 which is pivotally mounted at 126 to a stationary support carried by the bottom 39 of the housing. Attached to the free end of the L-shaped part 125 is a connecting rod 127, which connecting rod 127 is likewise connected to the actuating lever 128 at a pivot point 131. The pivot point 130, where the connecting lever 127 is connected to the L-shaped part 125, and the pivot point 131 where the connecting lever 127 is connected to the actuating rod 128, are movable. The upper end of the actuating rod 128 is pivotally mounted to a stationary pivot 129. Therefore, as the push rod 123 pushes downwardly in Figures 2, 29 and 30, the actuating rod 128 is swung to the left and thereby moves the carriage likewise to the left which causes the page-turning element 120 to move laterally across the pages of the book for turning the top lifted page. As illustrated, the page-turning element 120 has an L-shaped end portion 139 provided thereon which tends to turn as the page-turning element 120 is laterally pushed across the open pages of the book. In position five of Figure 23, the page-turning element 120 is actuated to its right-hand position as shown in Figure 24 of the drawing. In position five of Figure 23, the L-shaped end 139 of the page-turning element is in a vertical position in alignment with the vertical edge of the side 46 of the box-like structure, see Figure 27. In position five, the carriage 132 is stationary, but as the book-holding means moves rearwardly to position six then the end of the push rod 123 engages the L-shaped lever 124 to initiate movement of the page-turning element 120 in between the top and the next adjacent page of the book. As the book-holding means continues to move backwardly from the position six to the position eight, the page-turning element 120 must likewise be carried rearwardly along with the swing of the book-holding means, and in order to take care of this situation I mount the guide rails 133 and 134 at an angle with respect to the axis of the book-holding means or the support rods 42, see Figure 24. In this connection, it is noted that the page-turning element 120 in Figure 27, which corresponds to position five of Figure 23, has shifted laterally to the right as shown in Figure 28, which corresponds to position eight in Figure 23. The lateral shifting of the page-turning element 120 from Figure 27 to Figure 28, may be observed by comparing it to a vertical line 118 passing through the axis of the support rod 42 upon which the book-holding means swings. The page-turning element 120 is not only shifted laterally as shown in Figures 27 and 28 during the movement of the carriage to the position shown in Figure 24 to the position that the carriage occupies at the left-hand end of the guide rails 133 and 134, but the L-shaped end 139 must also be given a twist in order to accommodate rearwardly swinging angle of the book-holding means. This twisting movement is provided by having a cam wheel 146 ride against a longitudinal rail 145 which is also disposed at an angle with respect to the guide rails 133 and 134. The right-hand end of the page-turning element 120 is carried in bearings 142 and 143 carried by the carriage 132. A spring 140 is employed to urge the roller 146 against the side of an auxiliary rail 145. Thus, as the carriage moves to the left in Figure 24 the roller 146 tilts the L-shaped end 139 as it rolls along the rail 145. The tilting movement of the L-shaped end 139 may be observed by comparing Figures 27 and 28, as well as Figures 25 and 26. The tilting of the L-shaped end 139 of the page-turning element 120 is not quite so much as the book-holding means itself tilts, so that in position eight the L-shaped end 139 tends to give the page a lifting and turning action as well as the turning of the page from the lateral movement of the page-turning element. After the page has been turned, a spring 141 connected to the actuating lever 128 draws the page-turning element 120 to the right to its original position in readiness for the turning of another page, the page-turning element being returned to its original position in position ten of Figure 23 which coincides with the position six in the forward tilting movement of the book-holding means.

The electrical part of the mechanism is shown in Figures 29 and 30, and the cyclic movement controlled thereby is effected by a cam wheel 151 and a cam surface 188 on the push rod 123. Mounted on the cam wheel 151 are two cam portions 152 and 153 which are raised from the periphery of the cam wheel. A roller 154 rides upon the cam surface 152 and operates the switch 156, and a roller 155 operates in conjunction with a raised portion 153 for operating the switch 157. When the operator desires to have a page turned by the mechanism, he merely depresses the switch 158 which establishes the circuit for energizing the motor 49 that drives the crank pin 51 and the cam wheel 151 as well as the crank 121 which operates the push rod 123. The circuit for energizing the motor 49 by depressing the push button 158 may be traced as follows: beginning at the terminal 161 of the supply source, current flows through conductors 163 and 164 to the motor 49 after which current flows through conductors 165 and 166 to the push button 158 and then through conductors 167, 168 and 169 to a switch 170 after which current flows through conductors 171 and 182 to the opposite terminal 162 of the supply source. The push button 158 is depressed until the roller 154 rolls off of the raised portion 152 of the cam wheel, after which time the switch 156 closes to shunt the circuit of the push button 158 which means that the motor 49 continues to run one complete cycle until the raised portion 152 again lifts the roller 154 to open the switch 156 which terminates the cyclic movement. While the cam wheel 151 makes one complete revolution the book-holding means 40 is moved from position one in Figure 23 through the positions two, three, four, five, six, seven, and eight, which is at the end of the first half-cycle, and then the book-holding means is re-tilted to positions nine, ten, eleven and one back to the starting position whereupon the switch 156 is again opened.

The switch 157 controls the motor 105 that drives the suction pump 103 and it is closed when the roller 155 rides on top of the cam surface 153. The switch 157 is closed between positions two and seven in Figure 23. The circuit for energizing the motor 105 driving the suction pump 103 may be traced as follows: beginning with the energized conductor 163 current flows through conductor 173, switch 159, conductor 174, switch 157, conductor 175, to the motor 105 after which current flows to conductor 172 to the opposite terminal of the supply source. While the electrical circuits are performing their duties, the mechanical movements are likewise performing their function as previously described whereby a page of the book is turned automatically by the operator depressing the push button 158.

When the operator desires to insert a new book and remove the old one, he removes the cover 37 from the housing 31 to gain access to the book-holding means 40. The book is adapted to be exchanged when the book-holding means is in position eight of Figure 23, which is the most rearward position of the book-holding means. In position eight of Figure 23, which is at the end of the first half-cycle, the de-control circuit means shown in Figure 30 becomes operative to stop the electric motor 49 at the conclusion of the first half-cycle whereby the book may be exchanged for a new book. The de-control means is governed by a knob 180 which is adapted to rotate a shaft carried by bearings 181, whereby the rotating shaft has an off-set portion 182 that falls on top of actuating levers 183 and 184 for operating the switches 159 and 160. At the same time that the off-set portion 182 is operated, it laterally shifts a movable switch block 186 to the left by means of a mechanical connection shown by the dot-dash line 185. When the movable switch block 186 is moved to the left as shown in Figure 30, the roller 187 that actuates the switch 170 is adapted to be engaged by the cam 188 upon the push rod 123. The cam 188 is so timed and designed that it opens the switch 170 when the book-holding means is in the position eight for arresting the operation of the motor 49. When the de-control knob 180 is operated to depress the switch 159, the suction pump motor 105 is disconnected from the circuit by the opening of the switch 159 when the de-control shaft 182 is depressing the actuating lever as it will do when the knob 180 is turned in a counter-clockwise direction. In other words, the opening of the switch 159 prevents the suction pump motor 105 from operating as the book-holding means is moved from the first position to the eighth position. The closing of the switch 160 by the operation of the de-control knob provides a new circuit for operating the motor 49 for moving the book-holding means from position one to position eight, and this new circuit may be traced as follows: beginning with energized conductor 163, current flows through conductor 164 and then through motor 49 after which current flows through conductor 190 through switch 160 and then through conductors 191 and 169, through switch 170, and conductors 171 and 172 to the opposite side of the supply line. This circuit continues to be energized until the roller 187 which is engaged by the cam surface 188 on the push rod 123 opens the switch 170, at which point the motor 49 is arrested for stopping the book-holding means in position eight for the exchange of a book. A light 192 may be used to illuminate the book by closing a switch 193.

The Figure 30 shows the position of the circuit in the de-controlled position of the knob 180. The operation of the de-control knob 180 which moves the switch block 186 to the left also carries with it a pin 189 which fits under the push rod 123 and prevents the push rod 123 from engaging the end of the L-shaped lever 124, which means that the page-turning element 120 is not operated during the de-control half of the cycle as the book-holding means moves from the first position to the eighth position for the exchange of the book. That is to say, when the pin 189 is under the push rod 123, the end of the push rod passes over the top of the L-shaped lever 124, and therefore no mechanical movement takes place as would occur when the de-control knob is in the position shown in Figure 29. After the book has been exchanged from the book-holding means, the operator then turns the de-control knob 180 in a clockwise direction which restores the circuits to the position shown in Figure 29 whereupon the operator may turn the pages of the new book by depressing the switch 158.

From the foregoing description and drawings it is to be observed that the mechanism holds the book in a forwardly tilted position for reading purposes and then moves the book back to a rearwardly tilted position, during which tilting movement the top page of the book may be turned, and then restores the book to its original forwardly tilted position for reading purposes.

Although the present invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Mechanism for turning the pages of a book comprising, book-holding means for holding the book and having a surface upon which the back covers of the open book rest, means for swingably mounting the book-holding means, cyclic actuating means including means to start the cyclic movement for swinging the book-holding means through a recurrent cycle beginning at a first position and advancing in one direction through a second, third, fourth, fifth, sixth, and seventh position to an eighth position and then in an opposite direction through ninth, tenth and eleventh position back to said first position, said first to said eighth position embracing the first half-cycle and said eighth to said first position embracing the second half-cycle, said second, third, fourth, fifth, sixth and seventh positions being spaced apart in said first half cycle between said first position and said eighth position, said ninth, tenth, eleventh positions being spaced apart in said second one-half cycle between said eighth position and said first position, socket means carried by opposite sides of the book-holding means, a top transversely extending element having end portions releasably carried by the socket means and extending across the top part of the book-holding means in the region embracing the top portion of the open pages of the book to aid in confining the book on said book-holding means with the pages open, catch means to hold the end portions of the top transversely extending element in said socket means, a bottom transversely extending element for releasably extending across the bottom part of the book-holding means in the region embracing the bottom portion of the open pages of the book, spring means for urging the bottom transversely extending element in a direction toward the bottom portion of the open pages of the book to aid in confining said book on said book-holding means with said pages open, suction orifice means located on said book-holding means and positioned at a distance away from the face of the top one of the turnable pages of the book, suction creating means connected in communication wtih said suction orifice means, means responsive to movement of said book-holding means between said second and said seventh position to operate said suction creating means and draw air through said suction orifice means to lift the top one of the turnable pages up against said suction orifice means, finger means carried by the bottom of the book-holding means and spaced adjacent to an inward side of the suction orifice means for depressingly engaging the bottom portion of the lifted page between the center of the book and the suction orifice means, means responsive to the movement of said book-holding means between said third and seventh positions to depress said finger means against the bottom portion of the lifted page between the center of the book and the suction orifice means, thereby bending said bottom portion of the lifted page away from the suction orifice means and insuring separation of the lifted page from the next adjacent turnable page, means responsive to the movement of said book-holding means between said fourth and ninth positions for lifting said bottom transversely extending element to a raised position in a direction away from the bottom portion of the open pages of the book and thereby providing clearance space for the top turnable page to be turned, means responsive to the movement of said book-holding means in the region of said fifth position for operating the catch means to releasably permit removal of said top transversely extending means from said socket means, hook means stationarily positioned in the region of the fifth position on opposite sides of the path of the swinging book-holding means for intercepting the end portions of the top transversely extending means as said book-holding means moves by said fifth position, said hook means stationarily supporting said transversely extending means as continued movement of said book-holding means from said fifth to eighth positions carries the top portion of the open pages of the book away from the stationarily supported top transversely extending element to provide clearance space for the turnable page to be turned, page-turning means comprising a laterally movable element positioned to one side of the path of the book-holding means, means coordinated movement of said book-holding means in the region of said sixth position to initiate lateral movement of said page-turning means in between the top turnable page and the next adjacent page, means responsive to continued movement of the book holding means between said sixth and eighth positions to actuate the page turning means across the face of the book to completely turn the turnable page in the region of said eighth position, means responsive to the movement of said book-holding means between the said eighth and tenth positions to laterally withdraw said page-turning means from the turned page of said book and back to said one side of said book-holding means, means responsive to the movement of said book-holding means in the region of said ninth position to release said bottom transversely extending element from its raised position and permit said spring means to urge the bottom transversely extending element to its original position across the bottom portion of the book to aid in confining the book on the book-holding means, said socket means upon the return movement of the book-holding means in the region of the eleventh position re-engaging the top transversely extending element and removing same from the hook means, said catch means in response to movement of the book-holding means in the region of the eleventh position relatching the top transversely extending element and holding same across the face of the top portion of the pages of the book to aid in confining the book on the book-holding means, and means responsive to the return movement of the book-holding means to said first position for arresting the operation of the cyclic actuating means.

2. Mechanism for turning the pages of a book comprising, book-holding means for holding the book and having a surface upon which the back covers of the open book rest, means for swingably mounting the book-holding means, cyclic actuating means including a first electric motor and first switch means to start the cyclic movement for swinging the book-holding means through a recurrent cycle beginnng at a first position and advancing in one direction through a second, third, fourth, fifth, sixth, and seventh position to an eighth position and then in an opposite direction through a ninth, tenth and eleventh position back to said first position, said first to said eighth position embracing the first half-cycle and said eighth to said first position embracing the second half-cycle, said second, third, fourth, fifth, sixth and seventh positions being spaced apart in said first half cycle between said first position and said eighth position, said ninth, tenth, eleventh positions being spaced apart in said second one-half cycle between said eighth position and said first position, socket means carried by opposite sides of the book-holding means, a top transversely extending element having end portions releasably carried by the socket means and extending across the top part of the book-holding means in the region embracing the top portion of the open pages of the book to aid in confining the book on said book-holding means with the pages open, catch means to hold the end portions of the top transversely extending element in said socket means, a bottom transversely extending element for releasably extending across the bottom part of the book-holding means in the region embracing the bottom portion of the open pages of the book, spring means for urging the bottom transversely extending element in a direction toward the bottom portion of the open pages of the book to aid in confining said book on said book-holding means with said pages open, suction orifice means located on said book-holding means and positioned at a distance away from the face of the top one of the turnable pages of the book, suction creating means connected in communication with said suction orifice means, a second electric motor to operate said suction creating means, second switch means to operate said second motor, cam means responsive to movement of said book-holding means between said second and said seventh position to operate said second switch means and drive said second motor and said suction creating means to draw air through said suction orifice means to lift the top one of the turnable pages up against said suction orifice means, finger means carried by the bottom of the book-holding means and spaced adjacent to an inward side of the suction orifice means for depressingly engaging the bottom portion of the lifted page between the center of the book and the suction orifice means, first cam means responsive to the movement of said book-holding means between said third and seventh positions to depress said finger means against the bottom portion of the lifted page between the center of the book and the suction orifice means, thereby bending said bottom portion of the lifted page away from the suction orifice means and insuring separation of the lifted page from the next adjacent turnable page, second cam means responsive to the movement of said book-holding means between said fourth and ninth positions for lifting said bottom transversely extending element to a raised position in a direction away from the bottom portion of the open pages of the book and thereby providing clearance space for the top turnable page to be turned, third cam means responsive to the movement of said book-holding means in the region of said fifth position for operating the catch means to releasably permit removal of said top transversely extending means from said socket means, hook means stationarily positioned in the region of the fifth position on opposite sides of the path of the swinging book-holding means for intercepting the end portions of the top transversely extending means as said book-holding means moves by said fifth position, said hook means stationarily supporting said transversely extending means as continued movement of said book-holding means from said fifth to eighth positions carries the top portion of the open pages of the book away from the stationarily supported top transversely extending element to provide clearance space for the turnable page to be turned, page-turning means comprising a laterally movable element positioned to one side of the path of the book-holding means, crank and lever means coordinated with movement of said book-holding means in the region of said sixth position to initiate lateral movement of said page-turning means in between the top turnable page and the next adjacent page, said crank and lever means being responsive to continued movement of the book-holding means between said sixth and eighth positions to actuate the page-turning means across the face of the book to completely turn the turnable page in the region of said eighth position, said crank and lever means being further responsive to the movement of said book-holding means between the said eighth and tenth positions to laterally withdraw said page-turning means from the turned page of said book and back to said one side of said book-holding means, said second cam means being responsive to the movement of said book-holding means in the region of said ninth position to release said bottom transversely extending element from its raised position and permit said spring means to urge the bottom transversely extending element to its original position across the bottom portion of the book to aid in confining the book on the book-holding means, said socket means upon the return movement of the book-holding means in the region of the eleventh position re-engaging the top transversely extending element and removing same from the hook means, said third cam means operating said catch means in response to movement of the book-holding means in the region of the eleventh position to re-latch the top transversely extending element and hold same across the face of the top portion of the pages of the book to aid in confining the book on the book-holding means, and means responsive to the return movement of the book-holding means to said first position to operate said first switch means for arresting the operation of the first motor to stop said cycle actuating means.

3. Mechanism for turning the pages of a book comprising, book-holding means for holding the book and having a surface upon which the back covers of the open book rest, means for swingably mounting the book-holding means, cyclic actuating means including a first electric motor and first switch means to start the cyclic movement for swinging the book-holding means through a recurrent cycle beginning at a first position and advancing in one direction through a second, third, fourth, fifth, sixth, and seventh position to an eighth position and then in an opposite direction through a ninth, tenth and eleventh position back to said first position, said first to said eighth position embracing the first half-cycle and said eighth to said first position embracing the second half-cycle, said second, third, fourth, fifth, sixth and seventh positions being spaced apart in said first half cycle between said first position and said eighth position, said ninth, tenth, eleventh positions being spaced apart in said second one-half cycle between said eighth position and said first position, socket means carried by opposite sides of the book-holding means, a top transversely extending element having end portions releasably carried by the socket means and extending across the top part of the book-holding means in the region embracing the top portion of the open pages of the book to aid in confining the book on said book-holding means with the pages open, catch means to hold the end portions of the top transversely extending element in said socket means, a bottom transversely extending element for releasably extending across the bottom part of the book-holding means in the region embracing the bottom portion of the open pages of the book, spring means for urging the bottom transversely extending element in a direction toward the bottom portion of the open pages of the book to aid in confining said book on said book-holding means with said pages open, suction orifice means located on said book-holding means and positioned at a distance away from the face of the top one of the turnable pages of the book, suction creating means connected in communication with said suction orifice means, a second electric motor to operate said suction creating means, second switch means to operate said second motor, cam means coordinated with movement of said book-holding means between said second and said seventh position to operate said second switch means and drive said second motor and said suction creating means to draw air through said suction orifice means to lift the top one of the turnable pages up against said suction orifice means, finger means carried by the bottom of the book-holding means and spaced adjacent to an inward side of the suction orifice means for depressingly engaging the bottom portion of the lifted page between the center of the book and the suction orifice means, first cam means responsive to the movement of said book-holding means between said third and seventh positions to depress said finger means against the bottom portion of the lifted page between the center of the book and the suction orifice means, thereby bending said bottom portion of the lifted page away from the suction orifice means and insuring separation of the lifted page from the next adjacent turnable page, second cam means responsive to the movement of said book-holding means between said fourth and ninth positions for lifting said bottom transversely extending element to a raised position in a direction away from the bottom portion of the open pages of the book and thereby providing clearance space for the top turnable page to be turned, third cam means responsive to the movement of said book-holding means in the region of said fifth position for operating the catch means to releasably permit removal of said top transversely extending means from said socket means, hook means stationarily positioned in the region of the fifth position on opposite sides of the path of the swinging book-holding means for intercepting the end portions of the top transversely extending means as said book-holding means moves by said fifth position, said hook means stationarily supporting said transversely extending means as continued movement of said book-holding means from said fifth to eighth positions carries the top portion of the open pages of the book away from the stationarily supported top transversely extending element to provide clearance space for the turnable page to be turned, page-turning means comprising a laterally movable element positioned to one side of the path of the book-holding means, crank and lever means coordinated with movement of said book-holding means in the region of said sixth position to initiate lateral movement of said page-turning means in between the top turnable page and the next adjacent page, said crank and lever means being responsive to continued movement of the book-holding means between said sixth and eighth positions to actuate the page-turning means across the face of the book to completely turn the turnable page in the region of said eighth position, said crank and lever means being further responsive to the movement of said book-holding means between the said eighth and tenth positions to laterally withdraw said page-turning means from the turned page of said book and back to said one side of said book-holding means, said second cam means being responsive to the movement of said book-holding means in the region of said ninth position to release said bottom transversely extending element from its raised position and permit said spring means to urge the bottom transversely extending element to its original position across the bottom portion of the book to aid in confining the book on the book-holding means, said socket means upon the return movement of the book-holding means in the region of the eleventh position re-engaging the top transversely extending element and removing same from the hook means, said third cam means operating said catch means in response to movement of the book-holding means in the region of the eleventh position to re-latch the top transversely extending element and hold same across the face of the top portion of the pages of the book to aid in confining the book on the book-holding means, means responsive to the return movement of the book-holding means to said first position to operate said first switch means for arresting the operation of the first motor to stop said cyclic actuating means, and de-control means to render said second motor which operates the suction creating means and said crank and lever means inoperative during the first half-cycle and to stop said first motor at the end of said first half-cycle.

4. Mechanism for turning the pages of a book comprising, book-holding means for holding the book and having a surface upon which the back covers of the open book rest, means for swingably mounting the book-holding means, cyclic actuating means including means to start the cyclic movement for swinging the book-holding means through a recurrent cycle beginning at a first position and advancing in one direction through a first half-cycle and then in an opposite direction back through a second half-cycle to said first position, socket means carried by opposite sides of the book-holding means, a top transversely extending element having end portions releasably carried by the socket means and extending across the top part of the book-holding means in the region embracing the top portion of the open pages of the book to aid in confining the book on said book-holding means with the pages open, catch means to hold the end portions of the top transversely extending element in said socket means, a bottom transversely extending element for releasably extending across the bottom part of the book-holding means in the region embracing the bottom portion of the open pages of the book, spring means for urging the bottom transversely extending element in a direction toward the bottom portion of the open pages of the book to aid in confining said book on said book-holding means with said pages open, suction orifice means located on said book-holding means and positioned at a distance away from the face of the top one of the turnable pages of the book, suction creating means connected in communication with said suction orifice means, means responsive to movement of said book-holding means during said first half-cycle to operate said suction creating means and draw air through said suction orifice means to lift the top one of the turnable pages up against said suction orifice means, finger means carried by the bottom of the book-holding means and spaced adjacent to an inward side of the suction orifice means for depressingly engaging the bottom portion of the lifted page between the center of the book and the suction orifice means, means responsive to the movement of said book-holding means during said first half-cycle to depress said finger means against the bottom portion of the lifted page between the center of the book and the suction orifice means, thereby bending said bottom portion of the lifted page away from the suction orifice means and insuring separation of the lifted page from the next adjacent turnable page, means responsive to the movement of said book-holding means during said first half-cycle for lifting said bottom transversely extending element to a raised position in a direction away from the bottom portion of the open pages of the book and thereby providing clearance space for the top turnable page to be turned, means responsive to the movement of said book-holding means during an intermediate position of said first half-cycle for operating the catch means to releasably permit removal of said top transversely extending means from said socket means, hook means stationarily positioned in the region of said intermediate position on opposite sides of the path of the swinging book-holding means for intercepting the end portions of the top transversely extending means as said book-holding means moves by said intermediate position, said hook means stationarily supporting said transversely extending means as continued movement of said book-holding means from said intermediate position to the end of the first half-cycle carries the top portion of the open pages of the book away from the stationarily supported top transversely extending element to provide clearance space for the turnable page to be turned, page-turning means comprising a laterally movable element positioned to one side of the path of the book-holding means, means coordinated with movement of said book-holding means in the region of said intermediate position to initiate lateral movement of said page-turning means in between the top turnable page and the next adjacent page, means responsive to continued movement of the book-holding means between said intermediate position to the end to the first half-cycle to actuate the page turning means across the face of the book to completely turn the turnable page in the region of the end of the first half-cycle, means responsive to the movement of said book-holding means during the second half-cycle to laterally withdraw said page-turning means from the turned page of said book and back to said one side of said book-holding means, means responsive to the movement of said book-holding means during the second half-cycle to release said bottom transversely extending element from its raised position and permit said spring means to urge the bottom transversely extending element to its original position across the bottom portion of the book to aid in confining the book on the book-holding means, said socket means upon the return movement of the book-holding means in the region of said intermediate position re-engaging the top transversely extending element and removing same from the hook means, said catch means in response to movement of the book-holding means in the region of said intermediate position re-latching the top transversely extending element and holding same across the face of the top portion of the pages of the book to aid in confining the book on the book-holding means, and means responsive to the return movement of the book-holding means to said first position for arresting the operation of the cyclic actuating means.

5. A mechanism for turning the pages of a book comprising, book-holding means having first surface means and second surface means between which an open book may be placed with the back covers of the open book positioned next adjacent to the first surface and with the open pages of the book positioned next adjacent to the second surface, means for holding said book-holding means in a forward tilted position with the open pages of the book facing generally downwardly to hold said book in a readable position, said book in said forward tilted position of the book-holding means resting on said second surface and holding same in a readable position, means for tilting said book-holding means to a rearward tilted position with the open pages of the book facing generally upwardly, said book in the rearward tilted position resting on said first surface of the book-holding means, means responsive to said rearwardly tilting movement for separating the second surface means from the first surface means and thereby provide clearance space for the top one of the turnable pages of the book to be turned, means for turning the top one of the turnable pages, means for forwardly re-tilting the book-holding means from its rearward tilted position to its forward tilted position, and means responsive to said forwardly re-tilting movement for returning the second surface means to its original position and holding the book in its readable position.

6. Mechanism for turning the pages of a book comprising, book-holding means having first surface means and second surface means between which an open book may be placed with the back covers of the open book positioned next adjacent to the first surface and with the open pages of the book positioned next adjacent to the second surface, cyclic means for operating said first and second surface means through a recurrent cycle, means responsive to said cyclic means for holding said book-holding means in a forward tilted position with the open pages of the book facing generally downwardly to hold said book in a readable position, said book in said forward tilted position of the book-holding means resting on said second surface and holding same in a readable position, means responsive to said cyclic means through a first half-cycle for tilting said book-holding means to a rearward tilted position with the open pages of the book facing generally upwardly, said book in the rearward tilted position resting on said first surface of the book-holding means, means responsive to said rearwardly tilting movement for separating the second surface means from the first surface means and thereby provide clearance space for the top one of the turnable pages of the book to be turned, means for turning the top one of the turnable pages, means responsive to said cyclic means through a second half-cycle for forwardly re-tilting the book holding means from its rearward tilted position to its forward tilted position, and means responsive to said forwardly re-tilting movement for returning the second surface means to its original position and holding the book in its readable position.

7. Mechanism for turning the pages of a book comprising, book-holding means having first surface means and second surface means between which an open book may be placed with the back covers of the open book positioned next adjacent to the first surface and with the open pages of the book positioned next adjacent to the second surface, cyclic means for operating said first and second surface means through a recurrent cycle, means responsive to said cyclic means for holding said book-holding means in a forward tilted position with the open pages of the book facing generally downwardly to hold said book in a readable position, said book in said forward tilted position of the book-holding ing means resting on said second surface and holding same in a readable position, means responsive to said cyclic means through a first half-cycle for tilting said book-holding means to a rearward tilted position with the open pages of the book facing generally upwardly, said book in the rearward tilted position resting on said first surface of the book-holding means, means responsive to said rearwardly tilting movement for separating the second surface means from the first surface means and thereby provide clearance space for the top one of the turnable pages of the book to be turned, means responsive to said cyclic means through a second half-cycle for forwardly re-tilting the book-holding means from its rearward tilted position to its forward tilted position, means operable during at least one of said half-cycles for turning the top one of the turnable pages, and means responsive to said forwardly re-tilting movement for returning the second surface means to its original position and holding the book in its readable position.

8. Mechanism for turning the pages of a book comprising, book-holding means having first surface means and second surface means between which an open book may be placed with the back covers of the open book positioned next adjacent to the first surface and with the open pages of the book positioned next adjacent to the second surface, cyclic means for operating said first and second surface means through a recurrent cycle, means responsive to said cyclic means for holding said book-holding means in a forward tilted position with the open pages of the book facing generally downwardly to hold said book in a readable position, said book in said forward tilted position of the book-holding means resting on said second surface and holding same in a readable position, means responsive to said cyclic means through a first half-cycle for tilting said book-holding means to a rearward tilted position with the open pages of the book facing generally upwardly, said book in the rearward tilted position resting on said first surface of the book-holding means, means responsive to said rearwardly tilting movement for separating the second surface means from the first surface means and thereby provide clearance space for the top one of the turnable pages of the book to be turned, means responsive to said cyclic means through a second half-cycle for forwardly re-tilting the book-holding means from its rearward tilted position to its forward tilted position, means operable during at least said first half-cycle for turning the top one of the turnable pages, and means responsive to said forwardly re-tilting movement for returning the second surface means to its original position and holding the book in its readable position.

9. Mechanism for turning the pages of a book comprising, book-holding means for holding a book with the pages open and free for turning, suction orifice means located at a distance away from the face of the top one of the turnable pages of the book, suction creating means connected in communication with said suction orifice means, means to operate said suction creating means and draw air through said suction orifice means to lift the top one of said turnable pages, finger means spaced adjacent to an inward side of the suction orifice means for depressingly engaging the lifted page between the center of the book and said suction orifice means, means to depress said finger against the lifted page between the center of the book and the suction orifice means, thereby bending the lifted page away from the suction orifice means and insuring separation of the lifted page from the next adjacent turnable page, and page-turning means comprising a laterally movable element positioned to one side of the book-holding means and being laterally movable in between the top turnable page and the next adjacent page for turning the page.

10. Mechanism for turning the pages of a book comprising, book-holding means for holding a book with the pages open and free for turning, suction orifice means located at a distance away from the face of the top one of the turnable pages of the book to lift the top one of said turnable pages, depressing means to depress the lifted page between the center of the book and the suction orifice means, thereby bending the lifted page away from the suction orifice means and insuring separation of the lifted page from the next adjacent turnable page, and page-turning means laterally movable in between the top turnable page and the next adjacent page for turning the page.

11. Mechanism for separating the top one of assembled sheets from the sheet next adjacent to said top one, suction orifice means located at a distance away from the face of the top one of the assembled sheets to lift the top one of said separable sheets, depressing means to depress the lifted sheet at a place next adjacent to one side of said suction orifice means, thereby bending said lifted sheet away from the suction orifice means and insuring separation of the lifted sheet from the next adjacent sheet, and separating means laterally movable in between the top lifted sheet and the next adjacent sheet for separating said sheets.

12. Mechanism for turning the pages of a book comprising, book-holding means having first surface means and second surface means between which an open book may be placed with the back covers of the open book positioned next adjacent to the first surface and with the open pages of the book positioned next adjacent to the second surface, cyclic means for operating said first and second surface means through a recurrent cycle, means responsive to said cyclic means for holding said book holding means in a forward tilted position with the open pages of the book facing generally downwardly to hold said book in a readable position, said book in said forward tilted position of the book-holding means resting on said second surface and holding same in a readable position, means responsive to said cyclic means through a first half-cycle for tilting said book-holding means to a rearward tilted position with the open pages of the book facing generally upwardly, said book in the rearward tilted position resting on said first surface of the book-holding means, means responsive to said rearwardly tilting movement for separating the second surface means from the first surface means and thereby provide clearance space for the top one of the turnable pages of the book to be turned, means responsive to said cyclic means through a second half-cycle for re-tilting the book holding means from its rearward tilted position to its forward tilted position, page separating and turning means operable during at least one of said half-cycles for turning the top one of the turnable pages, and means responsive to said forwardly re-tilting movement for returning the second surface means to its original position and holding the book in its readable position, said page separating and turning means comprising suction orifice means located at a distance away from the face of the top one of the turnable pages of the book to lift the top one of said turnable pages, depressing means to depress the lifted page between the center of the book and the suction orifice means, thereby bending the lifted page away from the suction orifice means and insuring separation of the lifted page from the next adjacent turnable page, and page-turning means laterally movable in between the top turnable page and the next adjacent page for turning the page.

13. Mechanism for turning the pages of a book comprising, book-holding means having first surface means and second surface means between which an open book may be placed in a readable position with the back covers of the open book positioned next adjacent to the first surface and with the open pages of the book positioned next adjacent the second surface, means for separating said first and second surface means and retaining the back covers of the book against said first surface and thereby providing clearance space for the top one of the turnable pages of the book to be turned, page separating and turning means for turning the top one of the turnable pages, means for bringing together said first and second surfaces to their original position and holding the book in its readable position, said page separating and turning means comprising suction orifice means located at a distance away from the face of the top one of the turnable pages of the book to lift the top one of said turnable pages, depressing means to depress the lifted page between the center of the book and the suction orifice means, thereby bending the lifted page away from the suction orifice means and insuring separation of the lifted page from the next adjacent turnable page, and page-turning means laterally movable in between the top turnable page and the next adjacent page for turning the page.

14. Mechanism for turning the pages of a book comprising, book-holding means having first surface means and second surface means between which an open book may be placed with the back covers of the open book positioned next adjacent to the first surface and with the open pages of the book positioned next adjacent to the second surface, cyclic means for operating said first and second surface means through a recurrent cycle, means responsive to said cyclic means for holding said book-holding means in a forward tilted position with the open pages of the book facing generally downwardly to hold said book in a readable position, said book in said forward tilted position of the book-holding means resting on said second surface and holding same in a readable position, means responsive to said cyclic means through a first half-cycle for tilting said book-holding means to a rearward tilted position with the open pages of the book facing generally upwardly, said book in the rearward tilted position resting on said first surface of the book-holding means, means responsive to said rearwardly tilting movement for separating the second surface means from the first surface means and thereby provide clearance space for the top one of the turnable pages of the book to be turned, means responsive to said cyclic means through a second half-cycle for re-tilting the book-holding means from its rearward tilted position to its forward tilted position, means operable during said first half-cycle for turning the top one of the turnable, pages, and means responsive to said forwardly re-tilting movement for returning the second surface means to its original position and holding the book in its readable position, and means for arresting the cyclic means at the end of said first half-cycle.

MIRKO ROMANIUK.

References Cited in the file of this patent

UNITED STATES PATENTS

| Number | Name | Date |
| --- | --- | --- |
| 759,365 | Geyer | May 10, 1904 |
| 2,411,084 | Demers | Nov. 12, 1946 |
| 2,494,453 | Reck | Jan. 10, 1950 |
| 2,526,540 | Carpenter | Oct. 17, 1950 |